(12) United States Patent
Lai

(10) Patent No.: US 7,569,855 B2
(45) Date of Patent: Aug. 4, 2009

(54) MULTI-DOMAIN VERTICAL ALIGNMENT PIXEL STRUCTURE

(75) Inventor: Han-Chung Lai, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 150 days.

(21) Appl. No.: 11/693,732

(22) Filed: Mar. 30, 2007

(65) Prior Publication Data

US 2008/0078999 A1 Apr. 3, 2008

(30) Foreign Application Priority Data

Oct. 2, 2006 (TW) ................ 95136524 A

(51) Int. Cl.
*H01L 29/04* (2006.01)
*H01L 31/20* (2006.01)
*H01L 31/036* (2006.01)
*H01L 31/0376* (2006.01)

(52) U.S. Cl. ............ 257/59; 257/72; 257/E27.026; 349/43; 349/54

(58) Field of Classification Search ........... 257/59, 257/72, E27, E31, E27.026, E27.027, E25.002, 257/E25.028; 349/43, 54, 143, 144
See application file for complete search history.

(56) References Cited

U.S. PATENT DOCUMENTS 6,919,932 B2 * 7/2005 Ahn et al. ............. 349/42

2005/0012872 A1 1/2005 Beak
2005/0036091 A1 * 2/2005 Song ............... 349/129
2006/0012726 A1 1/2006 Wu et al.

FOREIGN PATENT DOCUMENTS

TW 200528806 9/2005

* cited by examiner

*Primary Examiner*—Phuc T Dang
(74) *Attorney, Agent, or Firm*—Jianq Chyun IP Office

(57) ABSTRACT

A multi-domain vertical alignment pixel structure including an active device, a passivation layer, a first pixel electrode, a second pixel electrode, a capacitor-coupling electrode and a semiconductor layer is provided. The active device is disposed on the substrate and has an insulating layer, the passivation layer covers the active device and a part of the insulating layer, the first pixel electrode and second pixel electrode are disposed on the passivation layer and electrically insulated from each other. In addition, the capacitor-coupling electrode is disposed between the second pixel electrode and the substrate. The semiconductor layer is disposed between the insulating layer and the passivation layer, wherein the insulating layer and the passivation layer have a trench and a lateral etched groove located on the sidewall of the trench, and the lateral etched groove exposes the side edge of the semiconductor layer.

12 Claims, 11 Drawing Sheets

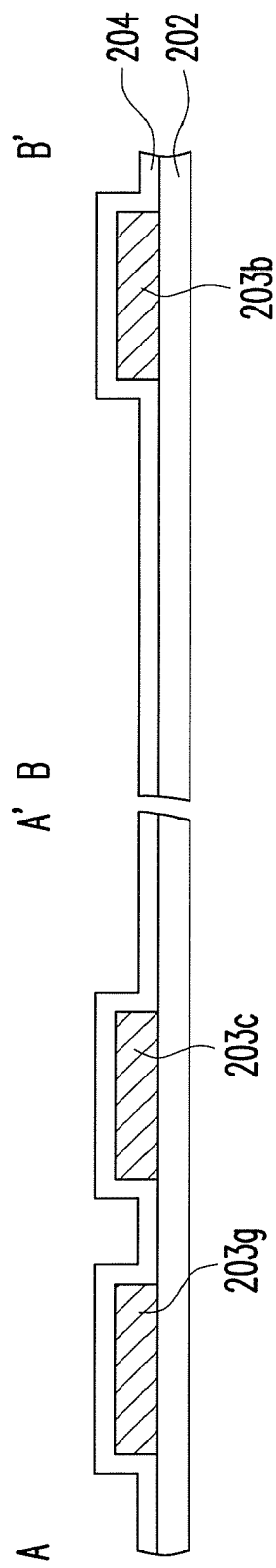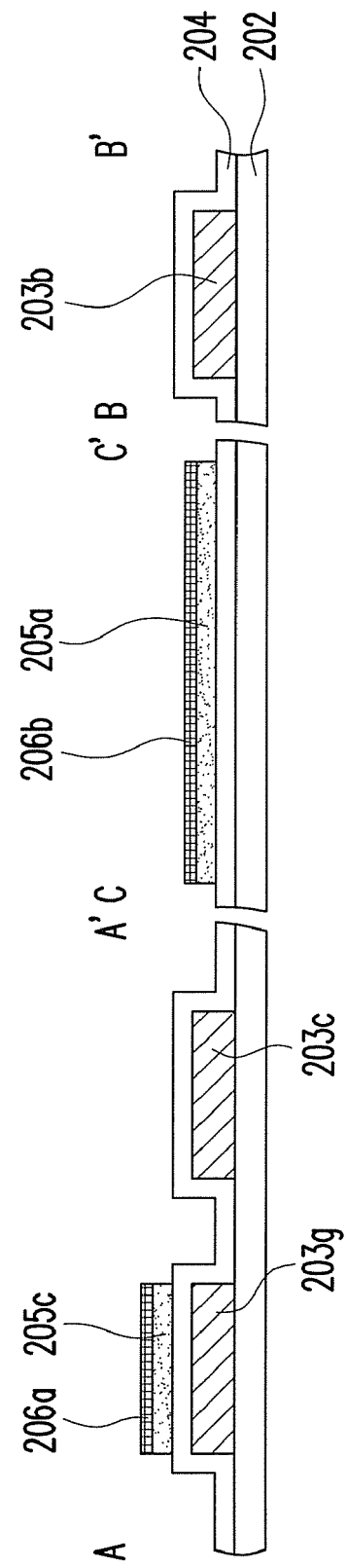
FIG. 2A
FIG. 2B

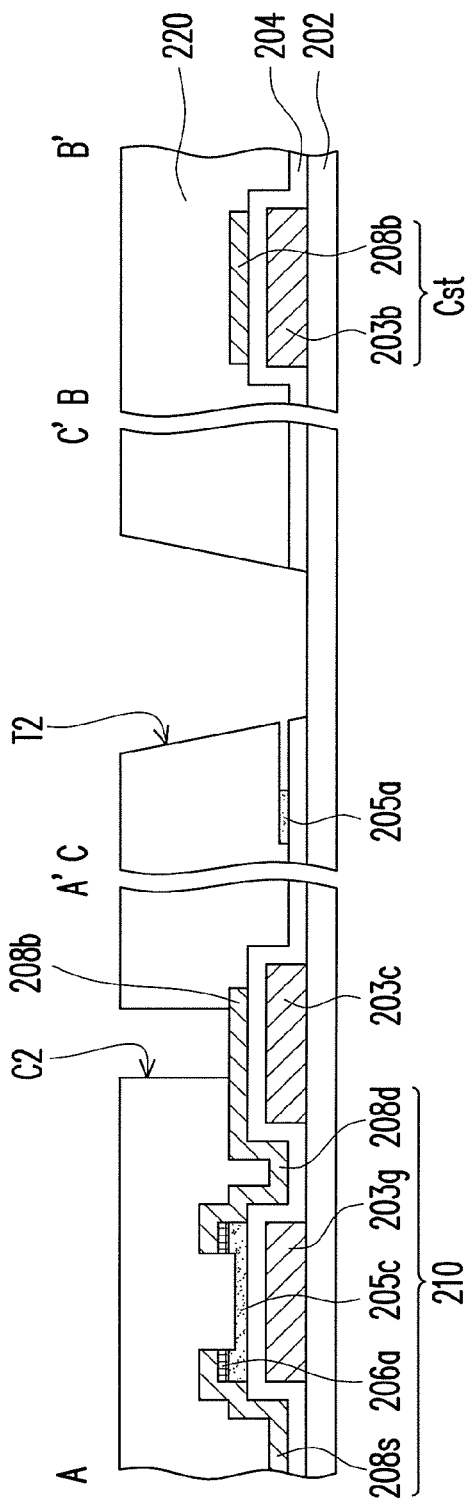
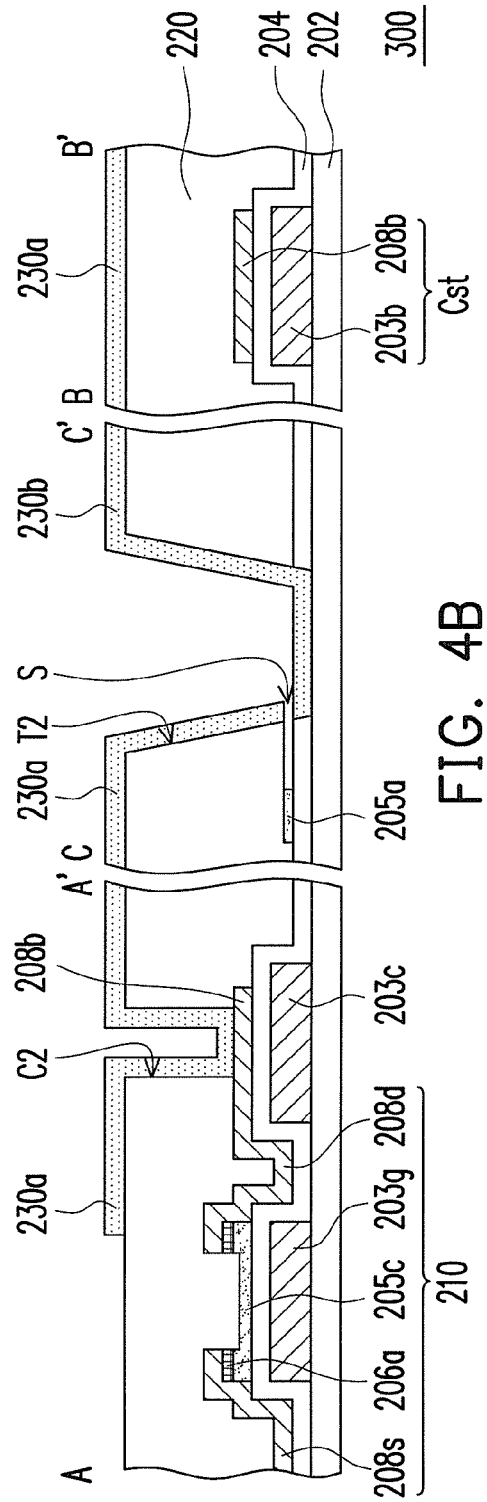
FIG. 4A
FIG. 4B

MULTI-DOMAIN VERTICAL ALIGNMENT PIXEL STRUCTURE

CROSS-REFERENCE TO RELATED APPLICATION

This application claims the priority benefit of Taiwan application serial no. 95136524, filed Oct. 2, 2006. All disclosure of the Taiwan application is incorporated herein by reference.

BACKGROUND OF THE INVENTION

1. Field of the Invention

The present invention generally relates to a pixel structure and the fabrication method thereof, and more particular, to a multi-domain vertical alignment pixel structure (MVA pixel structure) and the fabrication method thereof.

2. Description of Related Art

The rapid development in the multimedia industry is largely attributed to the progress in the semiconductor devices and display apparatuses. In terms of displays, the liquid crystal displays (LCDs), with such advantages as high display quality, high space utilization, low power consumption and no radiation, have played a major role in the mainstream display market. In order to improve the LCD display quality, various LCDs with wide viewing angle have been developed and are available on the market today. The common LCDs with wide viewing angle are, for example, in-plane switching (IPS) LCDs, fringe field switching (FFS) LCDs and multi-domain vertical alignment (MVA) LCDs.

FIG. 1A is a diagram of a conventional multi-domain vertical alignment pixel structure. Referring to FIG. 1A, an MVA pixel structure 100 is disposed on a substrate 102. The MVA pixel structure 100 comprises an active device 110, a first pixel electrode 120, a second pixel electrode 122, a plurality of capacitor-coupling electrodes 130 and a common line 140. Specifically, the active device 110 is electrically connected to a scan line 104 and a data line 106. In addition, the active device 110 is electrically connected to the first pixel electrode 120 through a via hole C1. The scan line 104 delivers a scanning signal for turning on the active device 110, followed by delivering a display signal to the first pixel electrode 120 through the turned-on active device 110. On the other hand, the active device 110 is electrically connected to the capacitor-coupling electrode 130, while the common line 140 is electrically connected to a reference voltage.

As supposed to be, the first pixel electrode 120 is insulated from the second pixel electrode 122, and the second pixel electrode 122 is electrically coupled to the capacitor-coupling electrode 130 therebelow. In other words, once the active device 110 is turned on, the first pixel electrode 120 and the second pixel electrode 122 respectively take different voltages, so that the liquid crystal molecules (not shown) respectively corresponding to the first pixel electrode 120 and the second pixel electrode 122 have different orientations.

However, an ITO residue issue may occur during the process of the MVA pixel structure 100 so that the first pixel electrode 120 is electrically connected to the second pixel electrode 122. As shown by FIG. 1B, which is the sectional view along sectioning plane I-I' in FIG. 1A, the residue R, remained during fabricating the first pixel electrode 120 and the second pixel electrode 122 and caused by the particles of environment or machine, may be located between the first pixel electrode 120 and the second pixel electrode 122. The residue R makes the first pixel electrode 120 and second pixel electrode 122 electrically connected to each other, which further leads to a poor display performance of the MVA pixel structure 100, and the problem needs to be solved properly.

SUMMARY OF THE INVENTION

Accordingly, the present invention is directed to provide a fabrication method of an MVA pixel structure to effectively advance the production yield rate.

The present invention is directed to provide a MVA pixel structure having better reliability.

As embodied and broadly described herein, the present invention provides a MVA pixel structure, which includes an active device, a passivation layer, a first pixel electrode, a second pixel electrode, a capacitor-coupling electrode and a semiconductor layer. The active device is disposed on a substrate. The active device has an insulating layer extending to outside the active device and covering the substrate. The passivation layer covers the active device and a part of the insulating layer. The above-mentioned first pixel electrode and second pixel electrode are disposed on the passivation layer. The first pixel electrode is electrically connected to the active device, while the second pixel electrode is electrically insulated from the first pixel electrode. In addition, the capacitor-coupling electrode is disposed between the second pixel electrode and the substrate and is electrically connected to the active device. The above-mentioned semiconductor layer is disposed between the insulating layer and the passivation layer, wherein there is a trench in the insulating layer and the passivation layer, and a lateral etched groove is located on a sidewall of the trench. The lateral etched groove exposes the side edge of the semiconductor layer.

In an embodiment of the present invention, the above-mentioned lateral etched groove may be located on the sidewall of the trench adjacent to the first pixel electrode.

In an embodiment of the present invention, the above-mentioned lateral etched groove may be located on the sidewall of the trench adjacent to the first pixel electrode and on the sidewall of the trench adjacent to the second pixel electrode.

In an embodiment of the present invention, the above-mentioned lateral etched groove may be located on the sidewall of the trench adjacent to the second pixel electrode.

In an embodiment of the present invention, the above-mentioned semiconductor layer may include an amorphous silicon (a-Si) layer.

In an embodiment of the present invention, the above-mentioned MVA pixel structure further includes a storage capacitor disposed on the substrate and electrically connected to the active device.

In an embodiment of the present invention, the above-mentioned storage capacitor may include a first capacitor electrode and a second capacitor electrode. The first capacitor electrode is disposed on the substrate, while the insulating layer covers the first capacitor electrode. The second capacitor electrode is disposed on the insulating layer over the first capacitor electrode and is electrically connected to the active device.

In an embodiment of the present invention, the above-mentioned capacitor-coupling electrode is electrically connected to the active device through the second capacitor electrode.

In an embodiment of the present invention, the above-mentioned capacitor-coupling electrode is located between the insulating layer and the passivation layer.

In an embodiment of the present invention, the above-mentioned active device includes a gate, a channel layer, a source and a drain. The gate is disposed on the substrate and the insulating layer covers the gate. The channel layer is disposed on the insulating layer over the gate. Additionally, the above-mentioned source and drain are disposed on the channel layer, while the source and the drain are located at both sides of the gate.

In an embodiment of the present invention, the above-mentioned active device further includes an ohmic contact layer disposed between the channel layer and the source and between the channel layer and the drain.

The present invention provides a fabrication method of an MVA pixel structure. The method includes the following steps. First, a substrate is provided and a gate is formed on the substrate. Next, an insulating layer is formed on the substrate to cover the gate. Then, a channel layer and a semiconductor layer are formed on the insulating layer, wherein the channel layer is located over the gate. After that, a source, a drain and a capacitor-coupling electrode are formed, wherein the source and drain are located on the channel layer and located at both sides of the gate, respectively. A passivation layer is formed to cover the source, the drain, a part of the channel layer and a part of semiconductor layer. A via hole is formed in the passivation layer to expose the drain and a trench is formed in the passivation layer and insulating layer such that a lateral etched groove is formed on the sidewall of the trench, wherein the lateral etched groove exposes the side edge of the semiconductor layer. A first pixel electrode and a second pixel electrode are formed on the passivation layer at both sides of the trench, respectively, wherein the first pixel electrode is electrically connected to the drain through the via hole, while the second pixel electrode is located over the capacitor-coupling electrode and is electrically insulated from the first pixel electrode.

In an embodiment of the present invention, the above-mentioned method for forming the trench may include using an etching process to remove a part of the passivation layer, a part of the semiconductor layer and a part of the insulating layer, wherein the etching process has an etching rate on the semiconductor layer higher than the etching rate on the passivation layer and the insulating layer.

In an embodiment of the present invention, the above-mentioned fabrication method of an MVA pixel structure further includes forming a storage capacitor on the substrate, wherein the storage capacitor is electrically connected to the drain.

In an embodiment of the present invention, the above-mentioned method for forming the storage capacitor includes the following steps. First, a first capacitor electrode is formed. Then, a second capacitor electrode is formed over the first capacitor electrode, wherein the drain is electrically connected to the second capacitor electrode.

In an embodiment of the present invention, the above-mentioned first capacitor electrode may be fabricated together with the gate, while the second capacitor electrode may be fabricated together with the source and the drain.

In an embodiment of the present invention, the above-mentioned capacitor-coupling electrode may be fabricated together with the source and the drain.

In an embodiment of the present invention, the above-mentioned fabrication method of an MVA pixel structure further includes forming an ohmic contact layer between the channel layer and the source and between the channel layer and the drain.

The present invention provides an MVA pixel structure, which includes an active device, a dielectric layer, a first pixel electrode, a second pixel electrode, a capacitor-coupling electrode and a lateral etched material layer. The active device and the dielectric layer are disposed on the substrate. The first pixel electrode and the second pixel electrode are disposed on the dielectric layer. The first pixel electrode is electrically connected to the active device, while the second pixel electrode is electrically insulated from the first pixel electrode. The above-mentioned capacitor-coupling electrode is disposed between the second pixel electrode and the substrate and is electrically connected to the active device. The above-mentioned lateral etched material layer is disposed in the dielectric layer, and the dielectric layer has a trench and a lateral etched groove located on the sidewall of the trench, wherein the lateral etched groove exposes the side edge of the lateral etched material layer.

The present invention provides a fabrication method of an MVA pixel structure, which includes the following steps. First, a substrate is provided. An active device, a dielectric layer, a capacitor-coupling electrode and a lateral etched material layer are formed on the substrate, wherein the capacitor-coupling electrode and the lateral etched material layer are located in the dielectric layer. A via hole, a trench and a lateral etched groove located on the sidewall of the trench are formed in the dielectric layer such that the lateral etched groove expose the side edge of the semiconductor layer. A first pixel electrode and a second pixel electrode are formed respectively on the dielectric layer at both sides of the trench, wherein the first pixel electrode is electrically connected to the active device through the via hole, while the second pixel electrode is electrically insulated from the first pixel electrode and located over the capacitor-coupling electrode.

Since the fabrication method of the MVA pixel structure in the present invention requires to form a lateral etched groove on the sidewall of the trench, the first pixel electrode and the second pixel electrode are assured to be electrically insulated from each other by the lateral etched groove, which contributes to effectively advance the production yield rate. Therefore, the MVA pixel structure fabricated by the fabrication method of the present invention demonstrates a much better performance.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2A-FIG. 2E are sectional views of the MVA pixel structure fabrication flow according to the first embodiment of the present invention.

FIG. 4A-FIG. 4B are sectional views of the MVA pixel structure fabrication flow according to the second embodiment of the present invention.

DESCRIPTION OF THE EMBODIMENTS

The First Embodiment

Figure 1A:
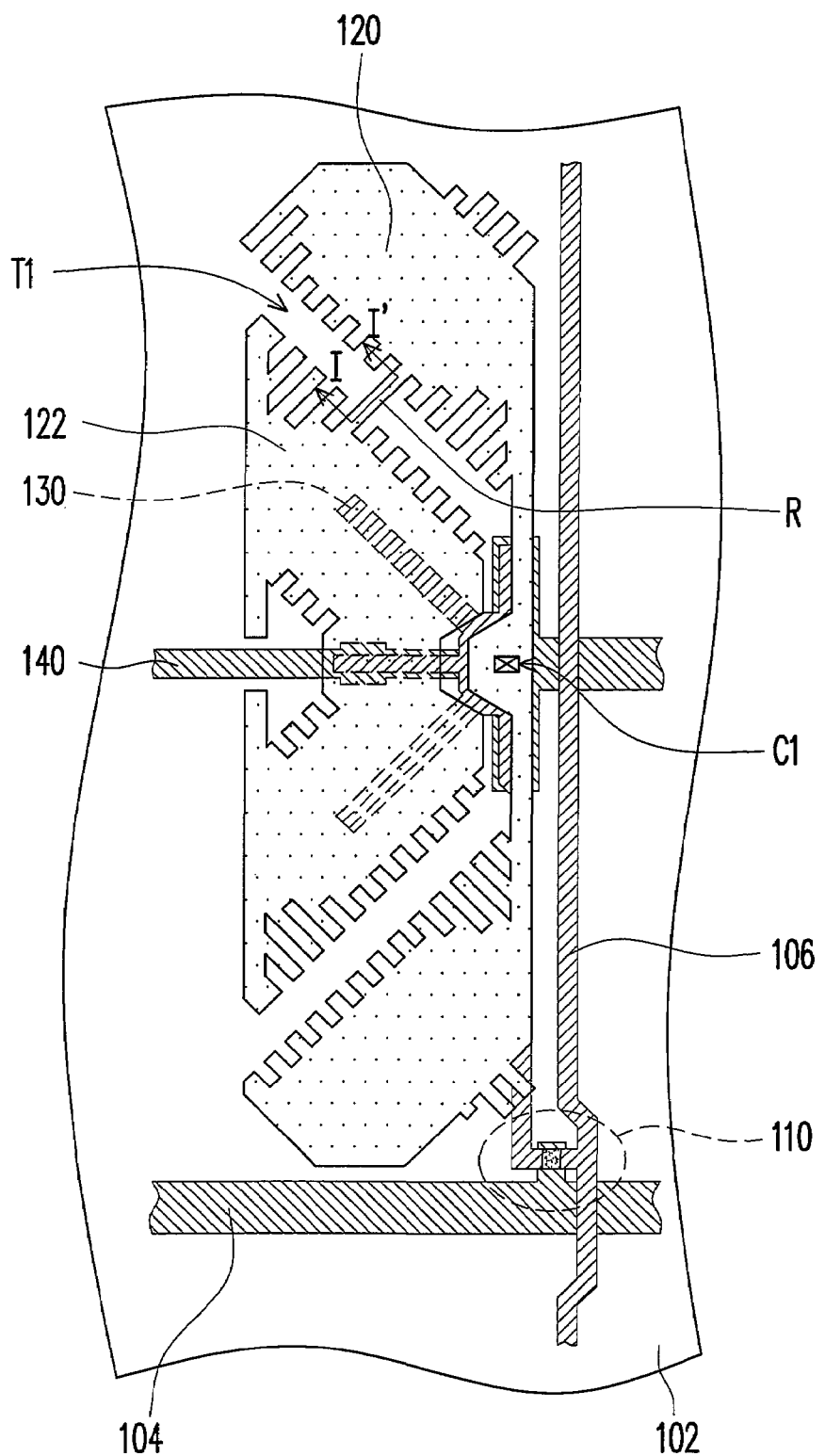
FIG. 1A is a diagram of a conventional multi-domain vertical alignment pixel structure.
Figure 1B:
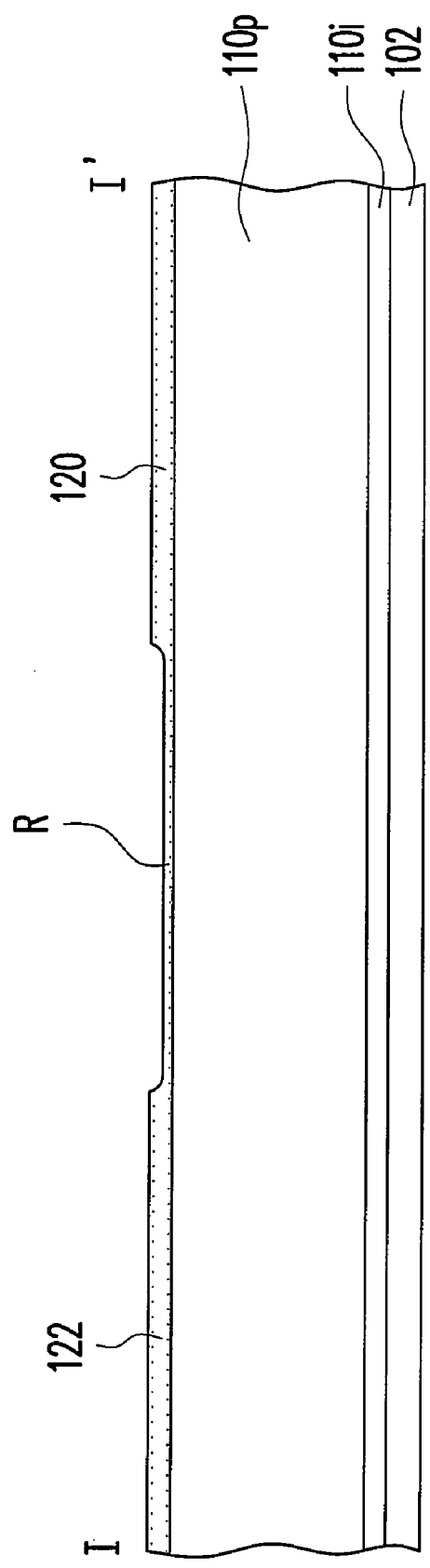
FIG. 1B is the sectional view along sectioning plane I-I' in FIG. 1A.
Figure 2C:
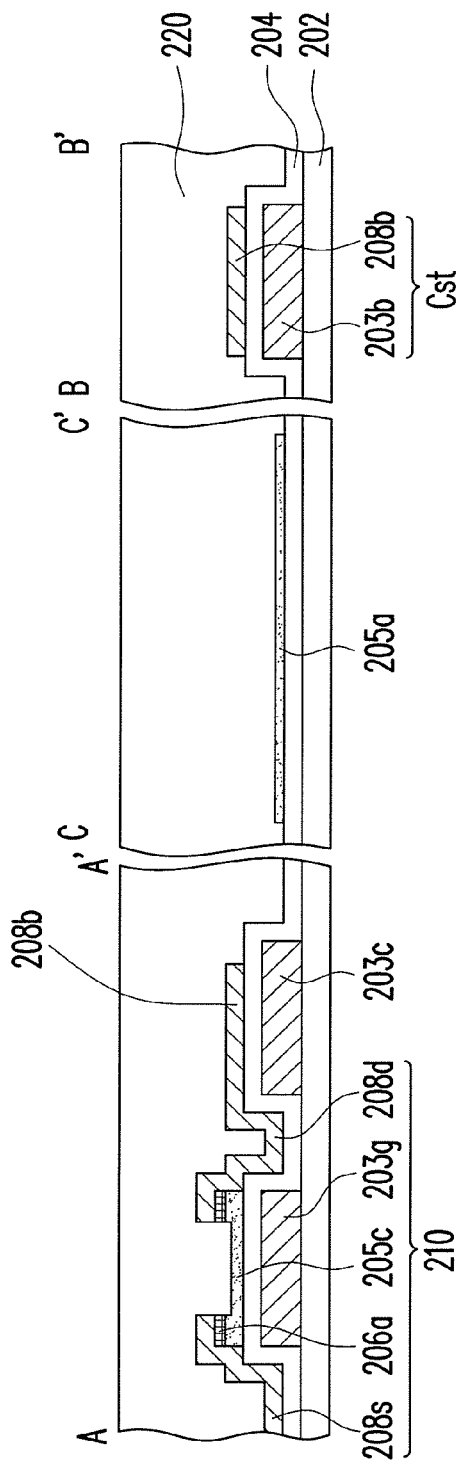
Figure 2D:
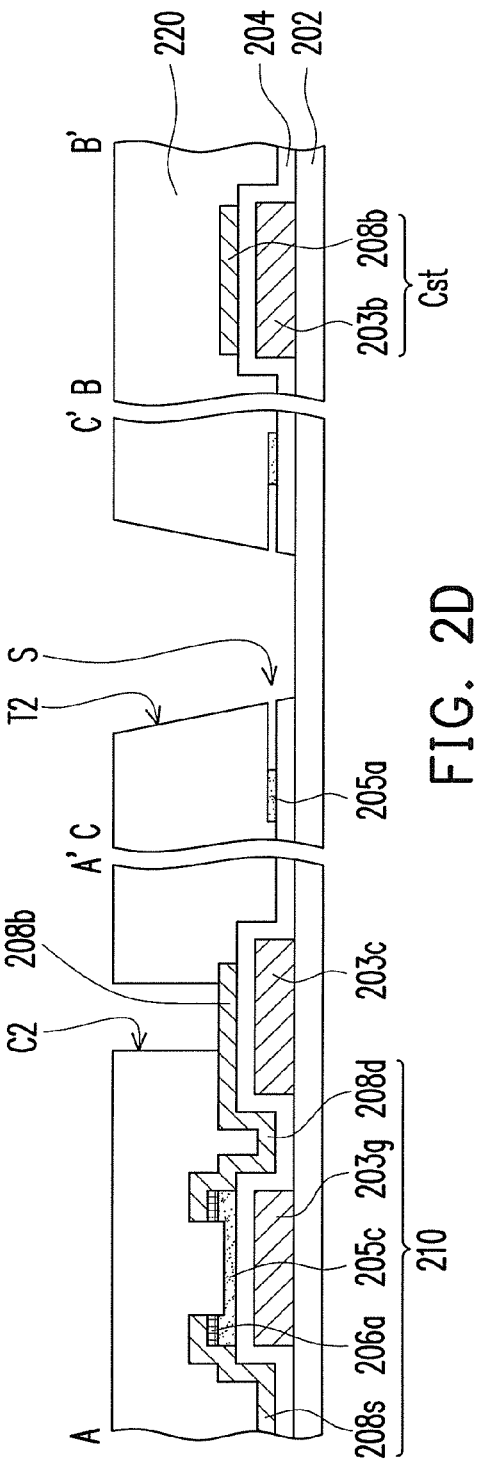
Figure 2E:
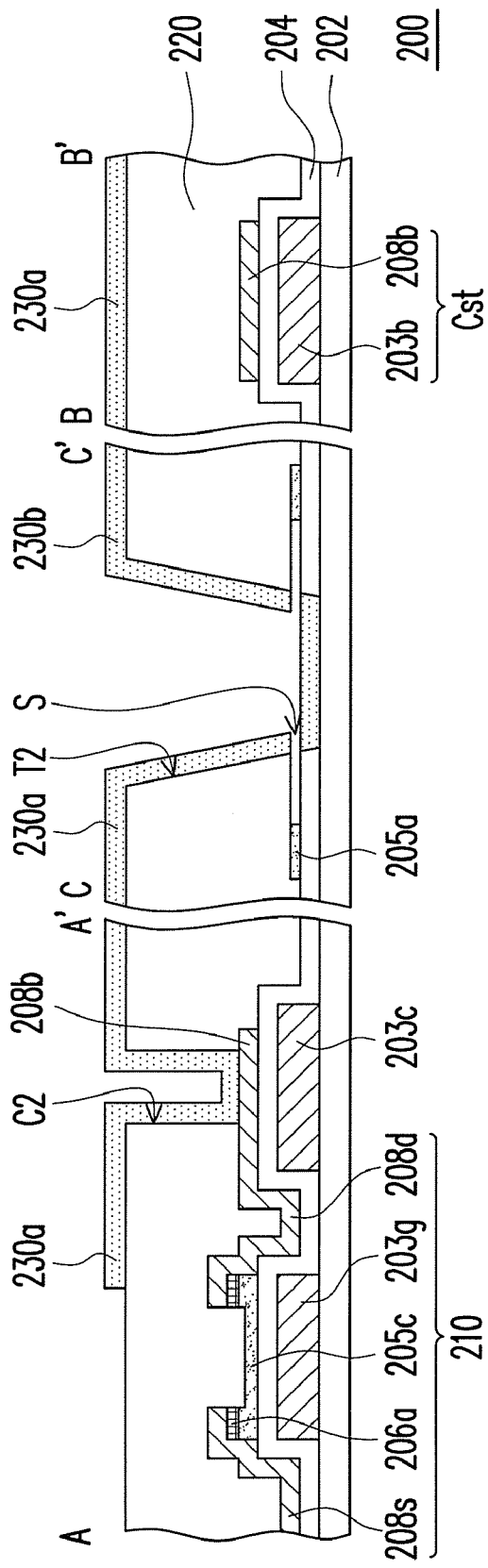
Figure 3A:
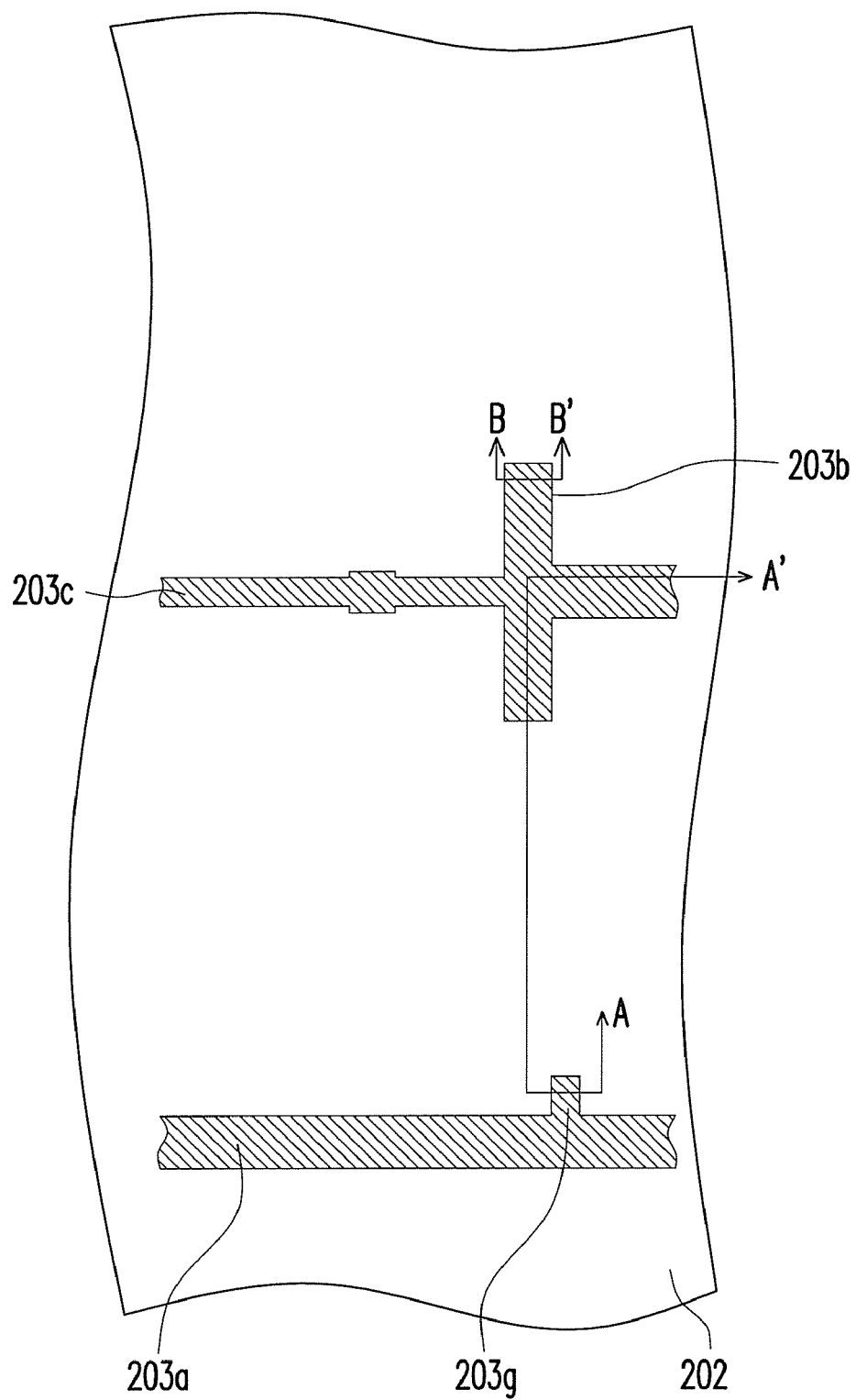
FIG. 3A-FIG. 3D are schematic locally-enlarged top views of the MVA pixel structure fabrication flow according to the first embodiment of the present invention.

FIG. 2A-FIG. 2E are sectional views of the MVA pixel structure fabrication flow according to the first embodiment of the present invention and FIG. 3A-FIG. 3D are schematic locally-enlarged top views of the MVA pixel structure fabrication flow according to the first embodiment of the present invention. Referring to FIGS. 2A and 3A, first, a substrate 202 is provided and a gate 203g is formed on the substrate 202. Generally, during forming the gate 203g, a scan line 203a, a first capacitor electrode 203b and a common line 203c may be formed simultaneously by the same photolithography and etching process for forming the gate 203g, wherein the scan line 203a is electrically connected to the gate 203g, while the first capacitor electrode 203b is electrically connected to the common line 203c.

For example, a physical vapor deposition (PVD) process is used to deposit metal material entirely on the substrate 202 for fabricating the gate 203g, the scan line 203a, the first capacitor electrode 203b and the common line 203c. The metal material may be copper, aluminum, molybdenum, chrome, titanium, gold, aluminum alloy, molybdenum alloy, or other material with low resistivity. Next, the metal material is patterned by using a photolithography and etching process, so as to form the gate 203g, the scan line 203a, the first capacitor electrode 203b and the common line 203c simultaneously. After that, an insulating layer 204 is formed on the substrate 202 to cover the gate 203g, the scan line 203a, the first capacitor electrode 203b and the common line 203c. The material of the above-mentioned insulating layer 204 may be silicon oxide (SiOx), which is formed by a process using silicon nitride or TEOS (tetraethylorthosilicate, $Si(OC_2H_5)_4$) as the reaction gas source. For simplicity, the insulating layer 204 is omitted in FIG. 3A.

Figure 3B:
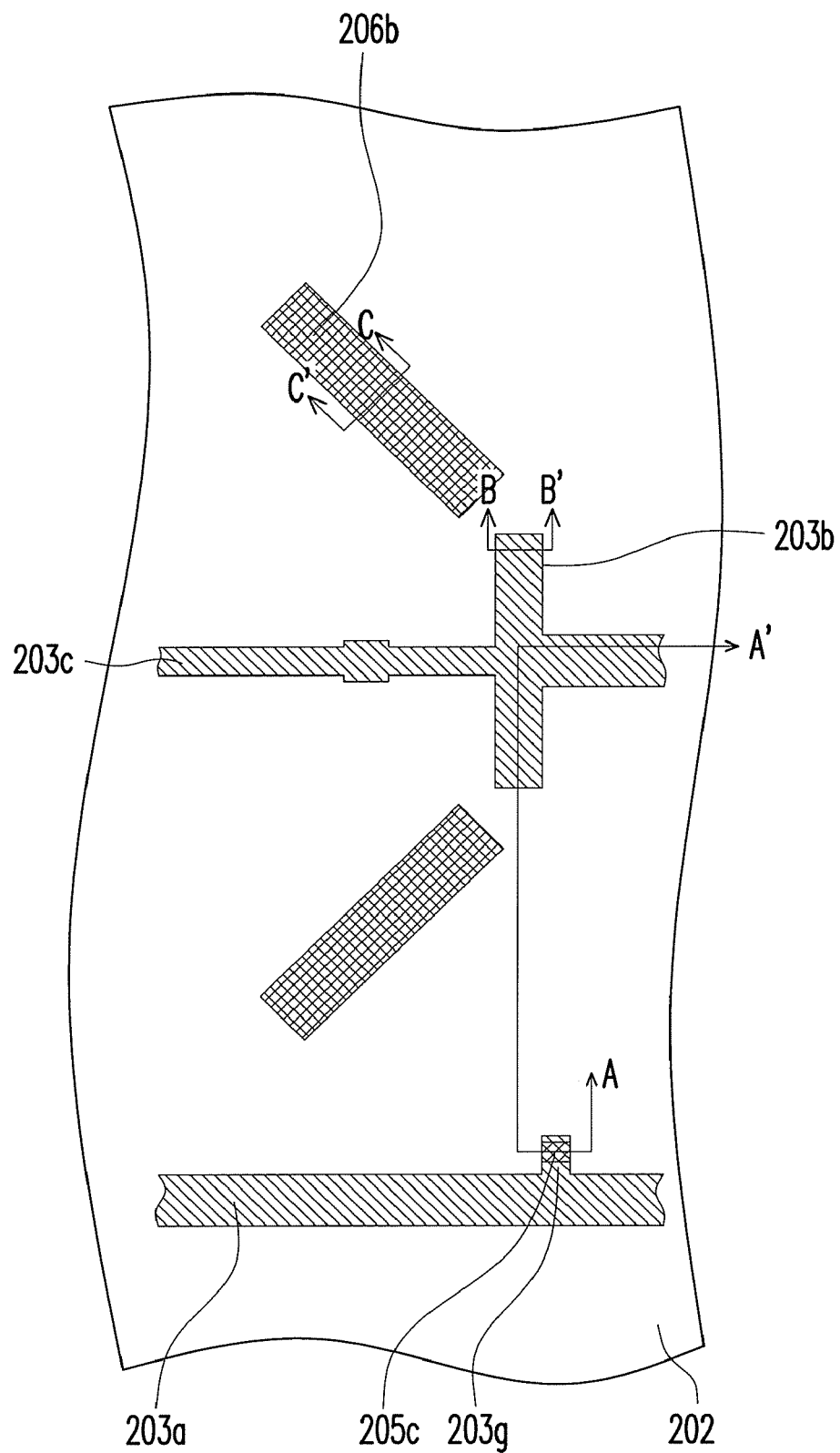

Referring to FIGS. 2B and 3B, a channel layer 205c and a semiconductor layer 205a are formed on the insulating layer 204, wherein the channel layer 205c is located on the insulating layer 204 over the gate 203g. Generally, the materials of the channel layer 205c and the semiconductor layer 205a may be amorphous silicon (a-Si), or other materials.

In order to reduce the contact impedance between the channel layer 205c and a metal material, an ohmic contact layer 206a is preferably formed on the surface of the channel layer 205c. Specifically, an a-Si layer for example, is formed entirely on the insulating layer 204, then an N-type ion implanting process is performed to form a N-type doped a-Si layer located on the a-Si layer. After that, the a-Si layer and the N-type doped a-Si layer are patterned simultaneously by a photolithography and etching process such that the channel layer 205c, the ohmic contact layer 206a, the semiconductor layer 205a and the N-type doped a-Si layer 206b located on the semiconductor layer 205a are formed simultaneously. It is noted that, the shapes and the positions of the semiconductor layer 205a and the N-type doped a-Si layer 206b shown in FIG. 2B and FIG. 3B is merely for illustration, the shapes and the positions are not limited and may be modified accordingly depending on the process requirement.

Figure 3C:
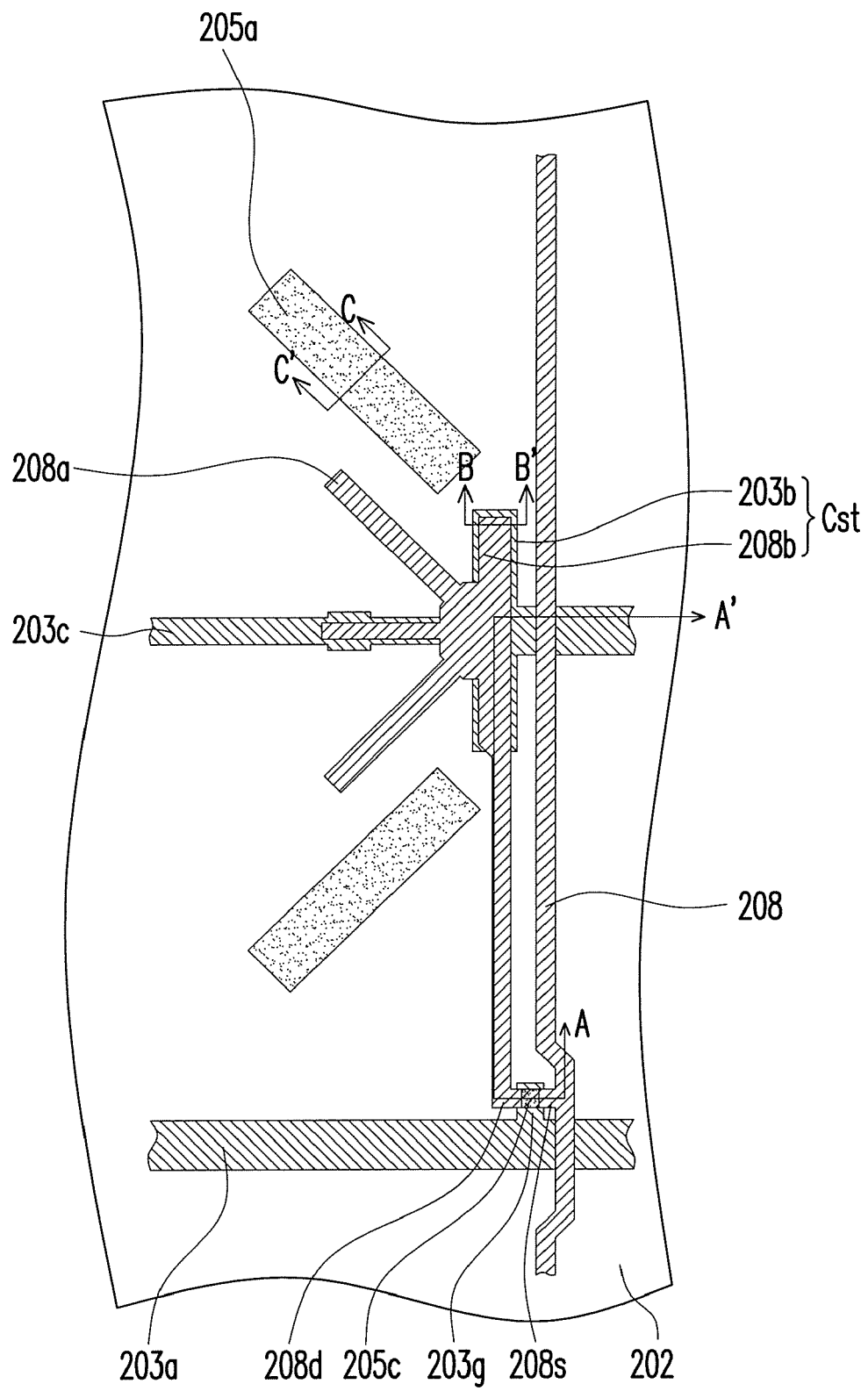

Referring to FIGS. 2C and 3C, a source 208s, a drain 208d, a capacitor-coupling electrode 208a and a second capacitor electrode 208b are formed, wherein the source 208s and the drain 208d are located on the channel layer 205c and at both sides of the gate 203g, respectively. As shown by FIG. 2C, the second capacitor electrode 208b is formed on the insulating layer 204 over the first capacitor electrode 203b so as to constitute a storage capacitor Cst together with the first capacitor electrode 203b. It is seen from FIG. 3C, the capacitor-coupling electrode 208a and the second capacitor electrode 208b are electrically connected to each other and are fabricated by the same film, while the second capacitor electrode 208b is electrically connected to the drain 208d.

Generally, during forming the source 208s, the drain 208d, the capacitor-coupling electrode 208a and the second capacitor electrode 208b, a data lane 208 may be formed simultaneously, wherein the data line 208 and the source 208c are electrically connected to each other and are fabricated by the same film. The above-mentioned gate 203g, the channel layer 205c, the ohmic contact layer 206a, the source 208s and the drain 208d are together form an active device 210.

Specifically, a PVD process is used to deposit metal material entirely on the insulating layer 204 for fabricating the data line 208, the source 208s, the drain 208d, the capacitor-coupling electrode 208a and the second capacitor electrode 208b. After that, a photolithography and etching process is performed to pattern the metal material so as to form the source 208s, the drain 208d, the data line 208, the capacitor-coupling electrode 208a and the second capacitor electrode 208b simultaneously. During forming the source 208s and the drain 208d, a part of the ohmic contact layer 206a, a part of the channel layer 205c and the N-type doped a-Si layer 206b (as shown in FIG. 2B) on the semiconductor layer 205a are removed together. Referring to FIG. 2C, a passivation layer 220 is formed on the substrate 202 to cover the source 208s, the drain 208d, a part of the channel layer 205c and a part of the semiconductor layer 205a. Generally, the material of the passivation layer 220 may be silicon oxide, silicon nitride, silicon oxynitride or polyimide.

Referring to FIG. 2D, a via hole C2 is formed in the passivation layer 220 to expose the second capacitor electrode 208b connected with the drain 208d, and a trench T2 and a lateral etched groove S are formed in the passivation layer 220 and the insulating layer 204, wherein the lateral etched groove S is located on the sidewall of the trench T2. Specifically, the lateral etched groove S exposes the side edge of the semiconductor layer 205a. The method for forming the above-mentioned trench T2 and lateral etched groove S is an etching process for removing a part of passivation layer 220, a part of semiconductor layer 205a and a part of insulating layer 204, for example. It is noted that, the etching process has an etching rate on the semiconductor layer 205a higher than the etching rate on the passivation layer 220 and the insulating layer 204. In this way, the semiconductor layer 205a is removed more effectively so as to form the lateral etched groove S.

Figure 3D:
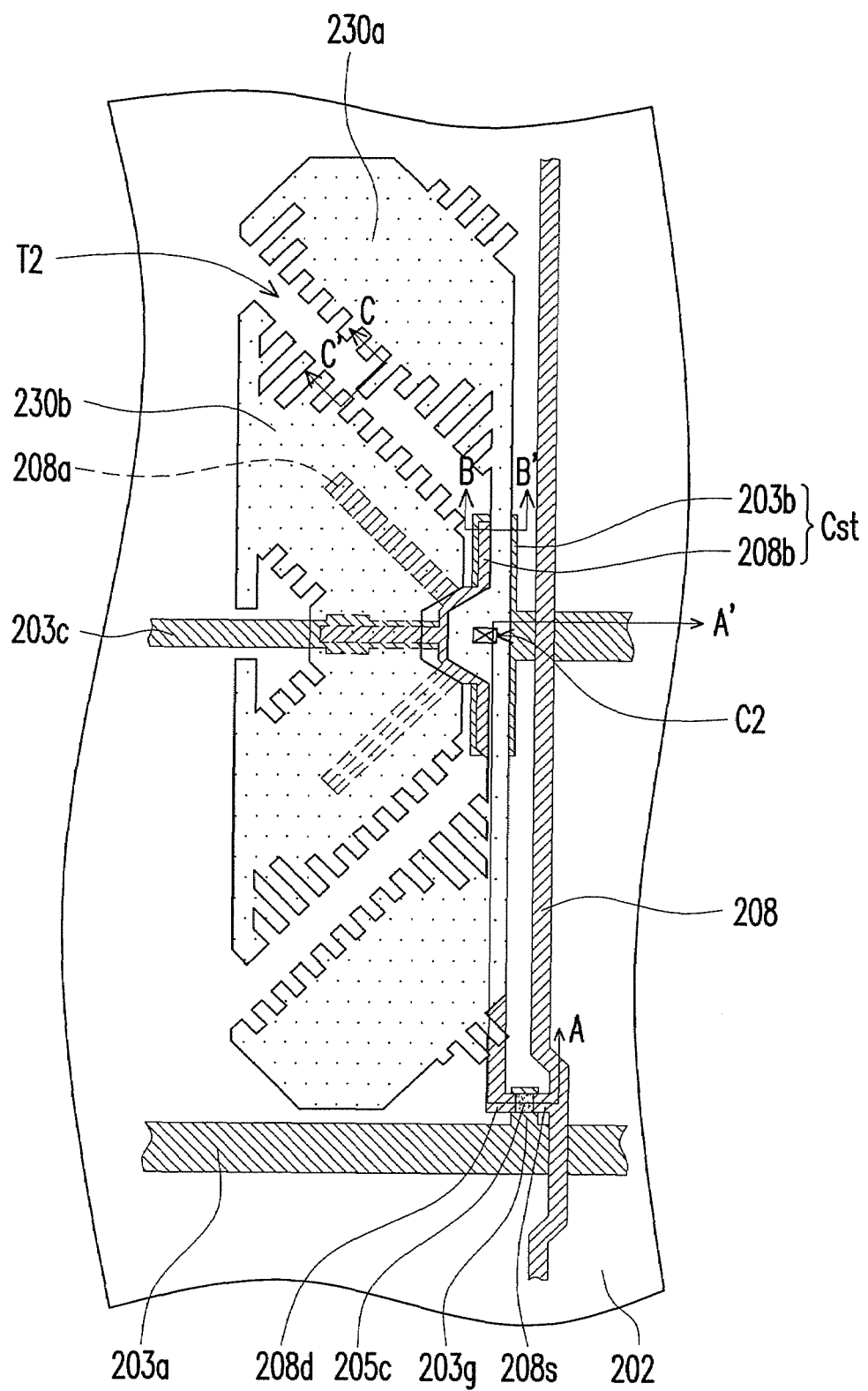

Referring to FIGS. 2E and 3D, a first pixel electrode 230a and a second pixel electrode 230b are formed on the passivation layer 220 at both sides of the trench T2, respectively, wherein the first pixel electrode 230a is electrically connected to the drain 208d through the via hole C2 and the second capacitor electrode 208b, while the second pixel electrode 230b is located over the capacitor-coupling electrode 208a. It is noted that, the second pixel electrode 230b is electrically insulated from the first pixel electrode 230a.

Since a lateral etched groove S is formed on the sidewall of the trench T2, even though the material for forming the first pixel electrode 230a and the second pixel electrode 230b has a residue remained on the sidewall and the bottom of the trench T2 (as shown by FIG. 2E), the first pixel electrode 230a and the second pixel electrode 230b are still assured to be electrically insulated from each other. Therefore, the fabrication method of an MVA pixel structure provided by the present invention can effectively advance the production yield rate.

The MVA pixel structure 200 fabricated by the above-mentioned method is shown in FIGS. 2E and 3D. The MVA pixel structure 200 of the present invention comprises an active device 210, a passivation layer 220, a first pixel electrode 230a, a second pixel electrode 230b, a semiconductor layer 205a and a capacitor-coupling electrode 208a, wherein the active device 210 is disposed on the substrate 202 and electrically connected to the scan line 203a and the data line 208. Anyone skilled in the art knows that the layout of the active device 210 in FIG. 3D may be modified according to different design requirement.

Specifically, the active device 210 may be a thin film transistor with a bottom gate, as shown in FIG. 2E, an insulating layer 204 is extended to outside the active device 210 and covers the substrate 202, while the passivation layer 220 covers the active device 210 and a part of the insulating layer 204. The active device 210 of the embodiment may further include an ohmic contact layer 206a (as shown in FIG. 2E) disposed between the channel layer 205c and the source 208s and between the channel layer 205c and the drain 208d.

In addition, the first pixel electrode 230a and the second pixel electrode 230b are disposed on the passivation layer 220, wherein the first pixel electrode 230a is electrically connected to the active device 210 through the via hole C2, while the second pixel electrode 230b is electrically insulated from the first pixel electrode 230a. The scan line 203a delivers a scanning signal for turning on the active device 210, followed by delivering a display signal to the first pixel electrode 230a through the data line 208 and the turned-on active device 210. Besides, the capacitor-coupling electrode 208a is disposed between the second pixel electrode 230b and the substrate 202 and the capacitor-coupling electrode 208a is electrically connected to the active device 210.

As shown by FIG. 2E, the above-mentioned semiconductor layer 205a is disposed between the insulating layer 204 and the passivation layer 220, wherein the insulating layer 204 and the passivation layer 220 have a trench T2 and a lateral etched groove S located on the sidewall of the trench T2, and the lateral etched groove S exposes the side edge of the semiconductor layer 205a. It is noted that, the semiconductor layer 205a located in the lateral etched groove S may be other kind of materials. For example, when the semiconductor layer 205a (i.e. the lateral etched material layer), the insulating layer 204 and the passivation layer 220 are removed by the same etchant, the lateral etched material layer having an etching rate higher than the etching rate of the insulating layer 204 and the passivation layer 220 is required. Therefore, the material of the lateral etched material layer is not limited to semiconductor.

The MVA pixel structure 200 of the present invention may further include a storage capacitor Cst disposed on the substrate 202. Specifically, the storage capacitor Cst may include a first capacitor electrode 203b and a second capacitor electrode 208b, wherein the first capacitor electrode 203b is disposed on the substrate 202, while the second capacitor electrode 208b is disposed on the insulating layer 204 over the first capacitor electrode 203b. In addition, the storage capacitor Cst is electrically connected to the active device 210 through the second capacitor electrode 208b. On the other hand, the capacitor-coupling electrode 208a located between the insulating layer 204 and the passivation layer 220 is electrically connected to the active device 210 through the second capacitor electrode 208b.

The Second Embodiment

The second embodiment is similar to the first embodiment except that the present embodiment adjusts the relative position between the trench T2 and semiconductor layer 205a so as to form the lateral etched groove S on the sidewall of the trench T2 only adjacent to the first pixel electrode 230a, as shown in FIG. 4A and FIG. 4B.

Referring to FIG. 4B, a first pixel electrode 230a and a second pixel electrode 230b are formed on the passivation layer 220 at both sides of the trench T2, respectively. The first pixel electrode 230a and the second pixel electrode 230b in the MVA pixel structure 300 of the embodiment are also assured to be electrically insulated from each other by the lateral etched groove S. In other words, even though the material for forming the first pixel electrode 230a and the second pixel electrode 230b has a residue remained on the sidewall and the bottom of the trench T2 (as shown by FIG. 4B), the first pixel electrode 230a and the second pixel electrode 230b are still assured to be electrically insulated from each other by the lateral etched groove S.

The Third Embodiment

Figure 5A:
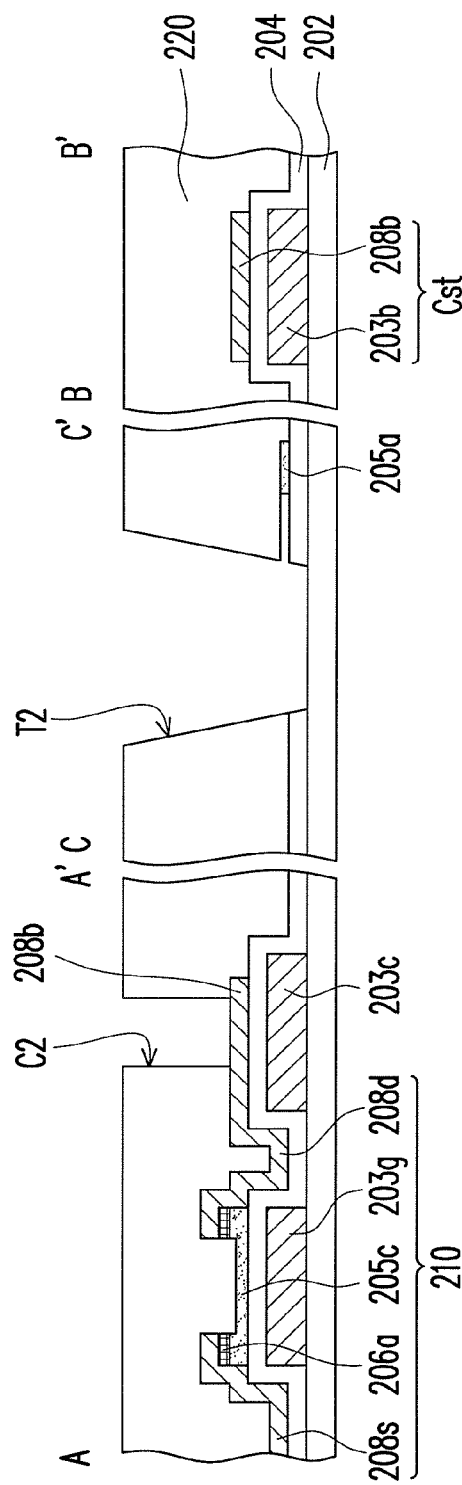
FIG. 5A-FIG. 5B are sectional views of the MVA pixel structure fabrication flow according to the third embodiment of the present invention.
Figure 5B:
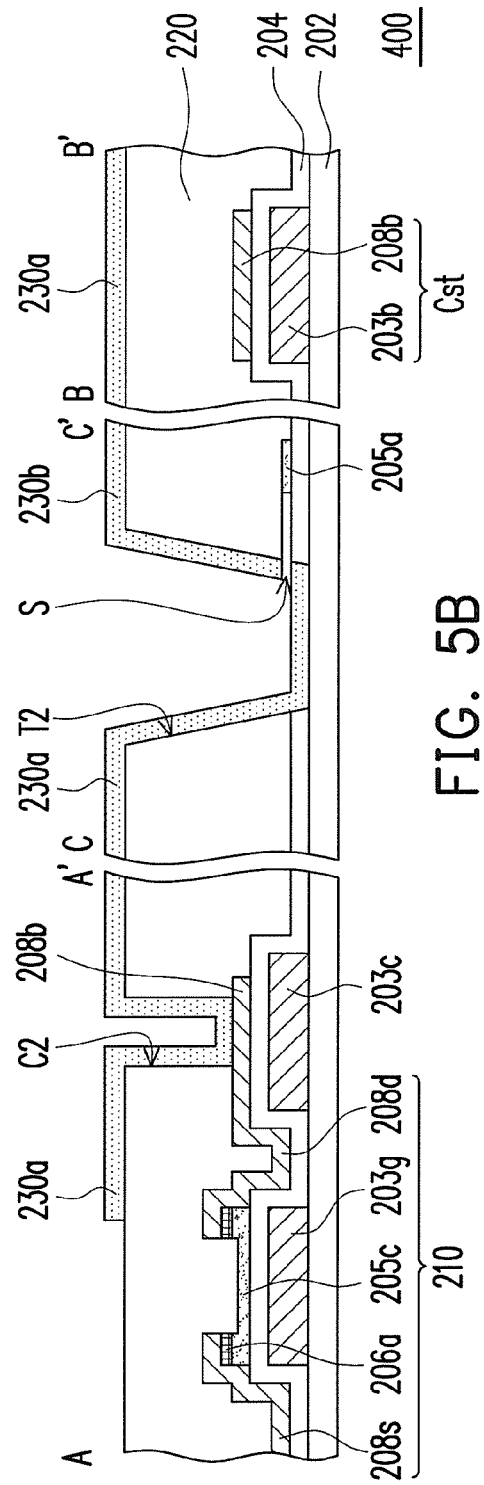

The third embodiment is similar to the first embodiment except that the present embodiment adjusts the relative position between the trench T2 and semiconductor layer 205a so as to form the lateral etched groove S on the sidewall of the trench T2 only adjacent to the second pixel electrode 230b, as shown in FIG. 5A and FIG. 5B.

Referring to FIG. 5B, a first pixel electrode 230a and a second pixel electrode 230b are formed on the passivation layer 220 at both sides of the trench T2, respectively. The first pixel electrode 230a and the second pixel electrode 230b in the MVA pixel structure 400 of the embodiment are also assured to be electrically insulated from each other by the lateral etched groove S.

In summary, since a lateral etched groove is formed on the sidewall of the trench, the first pixel electrode and the second pixel electrode are assured to be electrically insulated from each other by the lateral etched groove during fabricating the first pixel electrode and the second pixel electrode, which contributes to effectively advance the production yield rate. Therefore, the MVA pixel structure by using the fabrication method of the present invention has good reliability.

The above description provides a full and complete description of the preferred embodiments of the present invention. Various modifications, alternate construction, and equivalent may be made by those skilled in the art without changing the scope or spirit of the invention. Accordingly, the above description and illustrations should not be construed as limiting the scope of the invention which is defined by the following claims.

What is claimed is:

1. A multi-domain vertical alignment pixel structure disposed on a substrate, comprising:
   an active device, disposed on the substrate, wherein the active device has an insulating layer extending to outside the active device and covering the substrate;
   a passivation layer, covering the active device and a part of the insulating layer;
   a first pixel electrode, disposed on the passivation layer and electrically connected to the active device;
   a second pixel electrode, disposed on the passivation layer and electrically insulated from the first pixel electrode;

a capacitor-coupling electrode, disposed between the second pixel electrode and the substrate, wherein the capacitor-coupling electrode is electrically connected to the active device; and a semiconductor layer, disposed between the insulating layer and the passivation layer, wherein the insulating layer and the passivation layer have a trench and a lateral etched groove located on a sidewall of the trench, while the lateral etched groove exposes the side edge of the semiconductor layer.

2. The multi-domain vertical alignment pixel structure according to claim 1, wherein the lateral etched groove is located on the sidewall of the trench adjacent to the first pixel electrode.

3. The multi-domain vertical alignment pixel structure according to claim 2, wherein the lateral etched groove is further located on the sidewall of the trench adjacent to the second pixel electrode.

4. The multi-domain vertical alignment pixel structure according to claim 1, wherein the lateral etched groove is located on the sidewall of the trench adjacent to the second pixel electrode.

5. The multi-domain vertical alignment pixel structure according to claim 1, wherein the semiconductor layer comprises an amorphous silicon (a-Si) layer.

6. The multi-domain vertical alignment pixel structure according to claim 1, further comprising a storage capacitor disposed on the substrate, wherein the storage capacitor is electrically connected to the active device.

7. The multi-domain vertical alignment pixel structure according to claim 6, wherein the storage capacitor comprises:

a first capacitor electrode, disposed on the substrate and is covered by the insulating layer; and a second capacitor electrode, disposed on the insulating layer over the first capacitor electrode and electrically connected to the active device.

8. The multi-domain vertical alignment pixel structure according to claim 7, wherein the capacitor-coupling electrode is electrically connected to the active device through the second capacitor electrode.

9. The multi-domain vertical alignment pixel structure according to claim 1, wherein the capacitor-coupling electrode is located between the insulating layer and the passivation layer.

10. The multi-domain vertical alignment pixel structure according to claim 1, wherein the active device further comprises:

a gate, disposed on the substrate, wherein the insulating layer covers the gate;

a channel layer, disposed on the insulating layer over the gate; and a source and a drain, disposed on the channel layer, wherein the source and the drain are located at both sides of the gate.

11. The multi-domain vertical alignment pixel structure according to claim 10, wherein the active device further comprises an ohmic contact layer disposed between the channel layer and the source/drain.

12. A multi-domain vertical alignment pixel structure disposed on a substrate, comprising:

an active device, disposed on the substrate;

a dielectric layer, disposed on the substrate;

a first pixel electrode, disposed on the dielectric layer and electrically connected to the active device;

a second pixel electrode, disposed on the dielectric layer and electrically insulated from the first pixel electrode;

a capacitor-coupling electrode, disposed between the second pixel electrode and the substrate, wherein the capacitor-coupling electrode is electrically connected to the active device; and a lateral etched material layer, disposed in the dielectric layer, wherein the dielectric layer has a trench and a lateral etched groove located on a sidewall of the trench, while the lateral etched groove exposes the side edge of the lateral etched material layer.

* * * * *